United States Patent
Ikari et al.

(10) Patent No.: US 11,262,774 B2
(45) Date of Patent: Mar. 1, 2022

(54) HEAT SOURCE DEVICE FOR HEATING

(71) Applicant: NORITZ CORPORATION, Hyogo (JP)

(72) Inventors: Keiichi Ikari, Hyogo (JP); Masahiro Sugibayashi, Hyogo (JP); Yoshifumi Atobe, Hyogo (JP); Naoki Tsuda, Hyogo (JP); Nobuyuki Fushida, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 942 days.

(21) Appl. No.: 15/983,114

(22) Filed: May 18, 2018

(65) Prior Publication Data
US 2019/0003742 A1    Jan. 3, 2019

(30) Foreign Application Priority Data

Jun. 30, 2017    (JP) .............................. JP2017-128227

(51) Int. Cl.
| | |
|---|---|
| *G05D 23/19* | (2006.01) |
| *G05F 1/625* | (2006.01) |
| *F24H 1/52* | (2022.01) |
| *F24D 19/10* | (2006.01) |
| *F24H 9/20* | (2022.01) |
| *F24H 1/14* | (2022.01) |
| *G05D 23/00* | (2006.01) |

(52) U.S. Cl.
CPC ......... *G05D 23/19* (2013.01); *F24D 19/1066* (2013.01); *F24H 1/52* (2013.01); *G05D 23/1906* (2013.01); *G05F 1/625* (2013.01); *F24H 1/142* (2013.01); *F24H 9/2028* (2013.01); *G05D 23/00* (2013.01)

(58) Field of Classification Search
CPC .... F24D 19/1066; G05D 23/00; G05D 23/19; G05D 23/1906; F24H 1/52; F24H 9/2028; G05F 1/625
See application file for complete search history.

(56) References Cited

U.S. PATENT DOCUMENTS

| | | | | |
|---|---|---|---|---|
| 7,561,404 B2 * | 7/2009 | Sells | ..................... | H02J 7/0034 361/246 |
| 2010/0283623 A1 * | 11/2010 | Baxter | ................. | H01R 13/641 340/687 |
| 2010/0302052 A1 * | 12/2010 | Fan | ....................... | H02J 7/0034 340/653 |

FOREIGN PATENT DOCUMENTS

JP    3856353    12/2006

* cited by examiner

*Primary Examiner* — Santosh R Poudel
(74) *Attorney, Agent, or Firm* — JCIPRNET

(57) ABSTRACT

When a voltage signal is input to input terminals as a positive voltage, the voltage conversion circuit generates a control voltage proportional to an input voltage by a voltage-dividing circuit according to resistance elements, a voltage follower circuit according to an operational amplifier, and a voltage-dividing circuit according to resistance elements. When a voltage signal is input to the input terminals as a negative voltage, since the operational amplifier outputs a power supply voltage according to an input of the negative voltage, the voltage conversion circuit generates a predetermined positive voltage obtained by dividing the power supply voltage by the resistance elements as the control voltage. The predetermined positive voltage is higher than a voltage range of the control voltage when the voltage signal is input as the positive voltage.

3 Claims, 10 Drawing Sheets

HEAT SOURCE DEVICE FOR HEATING

CROSS-REFERENCE TO RELATED APPLICATION

This application claims the benefit of Japanese Application Serial No. 2017-128227, filed on Jun. 30, 2017. The entirety of the above-mentioned patent application is hereby incorporated by reference herein and made a part of this specification.

BACKGROUND

Technical Field

The present disclosure relates to a heat source device for heating, and more particularly to a heat source device for heating in which an output temperature of a heating medium is controlled according to an external voltage signal.

Description of Related Art

As one aspect of a heat source device for heating which supplies a heating medium for heating to a heating device, a device that changes a temperature of the heating medium in accordance with a voltage signal (for example, a heat demand signal) input from the outside is known.

In addition, Japanese Laid-open No. 3856353 (Patent Document 1) describes a technology for detecting an abnormality of a pressure sensor incorporated in a gas meter on the basis of an input value from the pressure sensor.

In the heating and hot-water supply system as described above, when polarity is reversed in a connection structure for inputting a voltage signal, a voltage signal is input with polarity thereof being reversed. For example, in a normal connection, when a voltage signal is input as a positive voltage, a negative voltage is input as the voltage signal due to the reversed connection.

On the other hand, inside the heat source device for heating, voltage conversion of the input voltage signal is performed, the signal is input to a control circuit of a microcomputer or the like, and the control circuit sets an output temperature of a heating medium at the time of heating ON/OFF of the heating medium and when heating the heating medium in accordance with the input voltage.

Therefore, when the internal voltage conversion is inappropriate, there is concern that an operation of the heat source device for heating may be inappropriate such as in a case in which heating of the heating medium is continuously stopped while polarity of the voltage signal is reversed to normal due to erroneous connection or the like.

[Patent Document 1] Japanese Laid-open No. 3856353

SUMMARY

A heat source device for heating according to the present disclosure includes a heating structure which heats a heating medium supplied to a heating device, a control circuit which sets a target output of the heating medium after being heated by the heating structure, an input terminal to which a voltage signal having single polarity is input by an electrical connection with the outside of the heat source device for heating, and a voltage conversion circuit which converts an input voltage generated at the input terminal into a control voltage input to the control circuit. The control circuit sets the target output according to the control voltage from the voltage conversion circuit. The voltage conversion circuit converts the input voltage into the control voltage such that the control voltage is set to be a voltage within a first voltage range in a voltage range not including a second polarity when polarity of the input voltage is a first polarity which is the same as polarity of the control voltage and the first polarity in the second polarity opposite to the first polarity. Further, the voltage conversion circuit converts the input voltage to the control voltage such that the control voltage is set to be a voltage within a second voltage range not overlapping the first voltage range in a voltage range not including the second polarity when polarity of the input voltage is the second polarity.

DESCRIPTION OF THE EMBODIMENTS

Figure 1:
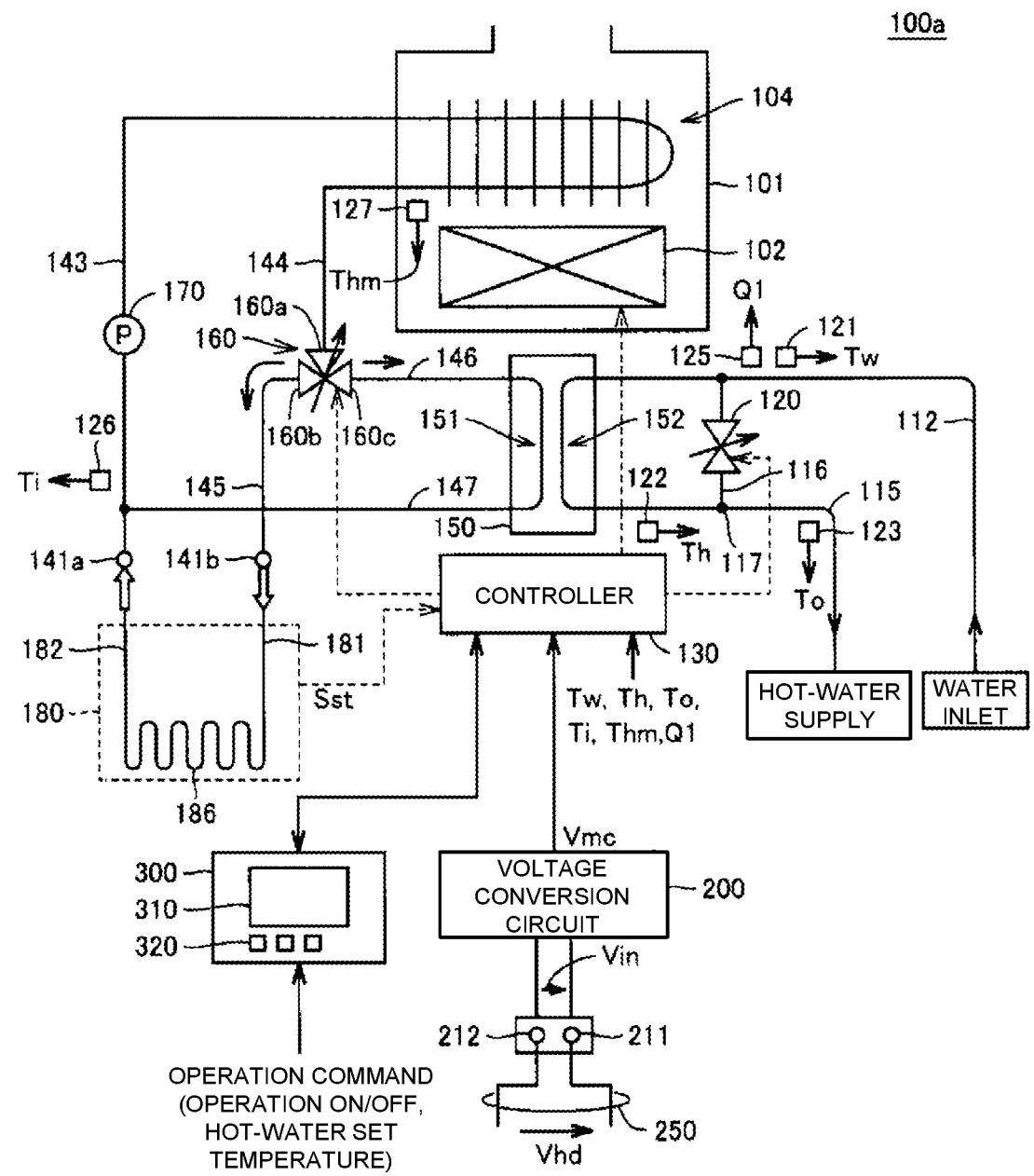
FIG. 1 is a block diagram for describing a configuration example of a heating and hot-water supply system which is a heat source device for heating according to an embodiment of the present disclosure.

The present disclosure avoids an inappropriate operation state even when polarity of a voltage signal is reversed to normal due to erroneous connection or the like in a heat source device for heating in which a set temperature of a heating medium to be supplied is controlled in accordance with an external voltage signal.

According to the heat source device for heating, it is possible to detect from the voltage range of the control voltage whether polarity of the input voltage, that is, polarity of the voltage signal input to the input terminal, is the first polarity or the second polarity. Therefore, when control corresponding to a voltage range of the control voltage is performed by the control circuit, it is possible to avoid occurrence of an inappropriate operation situation due to a state in which polarity of the input is different from normal continuing for a long time.

The heat source device for heating further includes a notification part. When the control voltage is within the second voltage range, the notification part notifies that polarity of the electrical connection to the input terminal is wrong.

In this way, since a user or service person can correct the input polarity of the voltage signal to the input terminal according to the output message, it is possible to prevent the state in which polarity of the input is different from normal from continuing for a long time.

The first polarity is a positive voltage. The control circuit stops the heating structure when the control voltage is lower than a predetermined threshold voltage which is a positive voltage while the control circuit sets the target output higher as the control voltage becomes higher when the control voltage is higher than the threshold voltage. The voltage conversion circuit converts the input voltage to the control voltage so that the second voltage range is lower than the threshold voltage.

In this way, when polarity of the input of the voltage signal to the input terminal is the second polarity, the voltage conversion circuit generates a control voltage in a voltage region in which the heating structure is stopped. Therefore, it is possible to realize control on a safer side that inhibits a possibility of malfunction of heating.

Alternatively, the voltage conversion circuit converts the input voltage to the control voltage so that the control voltage becomes a reference voltage which is a boundary value of the first and second voltage ranges when the input voltage is a ground voltage. The control circuit sets the target output higher as an absolute value of a difference between the control voltage and the reference voltage becomes larger.

In this way, since a target output of the heating medium (typically, a target temperature) can be set to correspond to a direct current (DC) voltage value of the voltage signal, regardless of whether polarity of the voltage signal input to the input terminal is the first polarity or the second polarity, it is possible to avoid occurrence of an inappropriate operation situation due to the input polarity of the voltage signal to the input terminal.

According to the present disclosure, in a heat source device for heating in which a set temperature of the heating medium to be supplied is controlled according to a voltage signal from the outside, even when polarity of the voltage signal is reversed to normal due to erroneous connection or the like, it is possible to avoid an inappropriate operation state.

Hereinafter, embodiments of the present disclosure will be described in detail with reference to the drawings. In the following description, the same or corresponding portions in the drawings are denoted by the same reference signs, and the description thereof will not be repeated in principle.

First Embodiment

FIG. 1 is a block diagram for describing a configuration example of a heating and hot-water supply system which is a heat source device for heating according to an embodiment of the present disclosure.

Referring to FIG. 1, a heating and hot-water supply system 100a has a heating function of supplying a heating medium (typically high-temperature water) to a heating device 180. Further, the heating and hot-water supply system 100a has a function of supplying hot-water from a hot-water outlet pipe 115 by heating low-temperature water introduced into a water inlet pipe 112 by exchanging heat with the heating medium that is common to the heating function.

The heating and hot-water supply system 100a includes a combustion can body 101 (hereinafter also simply referred to as "can body") in which a combustion burner 102, a heat exchanger 104, and the like are accommodated, an input end 141a and an output end 141b of the heating medium connected to the heating device 180, pipes 143 to 147, a hot-water supply heat exchanger 150, a distribution valve 160, and a circulation pump 170. The hot-water supply heat exchanger 150 has a heat transfer structure between a primary side path 151 and a secondary side path 152.

At the time of operation, the combustion burner 102 burns a supplied fuel gas with a burner (not illustrated) to generate an amount of heat. The heat exchanger 104 heats the heating medium flowing therethrough by the amount of heat generated by the combustion burner 102.

The heating device 180 includes a heat radiator 186. The heating device 180 is connected between the input end 141a and the output end 141b by external pipes 181 and 182. The heating device 180 further includes a control part (not illustrated). The control part outputs a heating operation signal Sst which is a binary signal to a controller 130 of the heating and hot-water supply system 100a. For example, when an operation of the heating device 180 is started according to an operation by a user, the heating operation signal Sst changes from "0" to "1." On the other hand, when the heating device 180 in operation stops according to an operation by the user, the heating operation signal Sst changes from "1" to "0."

The pipe 143 connects the input end 141a to an input side of the heat exchanger 104. The pipe 144 connects an output side of the heat exchanger 104 to a first node 160a of the distribution valve 160. The pipe 145 connects a second node 160b of the distribution valve 160 to the output end 141b.

The pipe 146 connects a third node 160c of the distribution valve 160 to an input side of the primary side path 151 of the hot-water supply heat exchanger 150. The pipe 147 connects an output side of the primary side path 151 of the hot-water supply heat exchanger 150 to the pipe 143.

A ratio of a flow rate in a path of the first node 160a and the second node 160b and a flow rate in a path of the first node 160a and the third node 160c is controlled by an opening degree of the distribution valve 160. The circulation pump 170 is disposed on a downstream side (on the heat exchanger 104 side) of a junction of the pipe 143 and the pipe 147.

A temperature sensor 126 for detecting an input temperature Ti of the heating medium is disposed in the pipe 143. A temperature sensor 127 disposed on an output side of the heat exchanger 104 detects a temperature Thm of the heating medium (hereinafter also referred to as an output temperature) after being heated by the heat exchanger 104.

On the hot-water supply side, the water inlet pipe 112 is connected to an input side of the secondary side path 152 of the hot-water supply heat exchanger 150. Low-temperature water is introduced into the water inlet pipe 112 in accordance with opening of a water tap (not illustrated) with as a tap water pressure or the like as a supply pressure.

The hot-water outlet pipe 115 is connected to an output side of the secondary side path 152 of the hot-water supply heat exchanger 150. A bypass pipe 116 in which a bypass flow valve 120 is disposed is branched off from the water inlet pipe 112. Therefore, the low-temperature water supplied to the water inlet pipe 112 is distributed to the bypass pipe 116 at a distribution ratio according to an opening degree of the bypass flow valve 120. The opening degree of the bypass flow valve 120 is controlled by the controller 130.

A junction 117 with the bypass pipe 116 is provided in the hot-water outlet pipe 115. Then, high-temperature water heated by the heat exchanger 104 and low-temperature water passed through the bypass pipe 116 are mixed and then supplied from the heating and hot-water supply system 100a to a hot-water supply tap (not illustrated) or the like. That is, a mixing ratio of the high-temperature water and the low-temperature water can be controlled by the opening degree of the bypass flow valve 120.

Temperature sensors 121 and 123 detect a low-temperature water temperature Tw of the water inlet pipe 112 and a hot-water outlet temperature To of the hot-water outlet pipe 115. A temperature sensor 122 is disposed on an output side of the secondary side path 152 and detects the high-temperature water temperature Th heated by the hot-water supply heat exchanger 150. A flow rate sensor 125 detects a flow rate introduced into the water inlet pipe 112.

The controller 130 receives the low-temperature water temperature Tw, the high-temperature water temperature Th, and the hot-water outlet temperature To which are detected by the temperature sensors 121 to 123, and the input temperature Ti and the output temperature Thm of the heating medium which are detected by the temperature sensors 126 and 127. Further, the controller 130 receives a flow rate Q1 detected by the flow rate sensor 125 and the heating operation signal Sst from the heating device 180.

The controller 130 further controls operation/stop of the circulation pump 170 and the opening degree of the distribution valve 160 in addition to the opening degree of the bypass flow valve 120, and operation/stop and a generated amount of heat of the combustion burner 102.

An operation command of the heating and hot-water supply system 100a from a user is input to a remote controller (hereinafter also simply referred to as a "remote") 300 of the heating and hot-water supply system 100a. For example, the operation command includes an operation ON/OFF command for switching between an operation ON state and an operation OFF state of the heating and hot-water supply system 100a, and a hot-water set temperature in a hot-water supply operation.

The remote controller 300 includes a display part 310 and an operation part 320. The display part 310 can be configured using, for example, a liquid crystal dot matrix to display visual information to the user. The operation part 320 can be configured using a push switch or a touch switch as an operation switch for a user to input operation commands. The display part 310 and the operation part 320 can be integrally formed using a touch panel.

The remote controller 300 and the controller 130 are capable of mutually transmitting signals by a connection via a duplex communication line or the like. That is, an operation ON/OFF command and a hot-water set temperature which are input to the remote controller 300 are transmitted from the remote controller 300 to the controller 130. In addition, it is also possible to display information based on data (hot-water temperature, or the like) collected by the controller 130 using the display part 310.

Next, an operation of the heating and hot-water supply system 100a will be described.

When the circulation pump 170 is operated and the distribution valve 160 forms a path of the heating medium between the first node 160a and the second node 160b, a heating circulation path for circulating the heating medium through the heating device 180 can be formed. Inside the heating and hot-water supply system 100a, the heating circulation path is formed to include the pipe 143, the heat exchanger 104, the pipe 144, the first node 160a and the second node 160b of the distribution valve 160, and the pipe 145 between the input end 141a and the output end 141b.

On the other hand, when the distribution valve 160 forms a path of the heating medium between the first node 160a and the third node 160c, a bypass path through which the heating medium bypassing the heating device 180 flows through the primary side path 151 of the hot-water supply heat exchanger 150 can be formed by the pipes 146 and 147. Thus, when the circulation pump 170 is operated, the heating medium heated by the heat exchanger 104 can flow through the bypass path. Further, according to the opening degree of the distribution valve 160, it is possible to control a distribution ratio to the bypass path with respect to the flow rate of the heating circulation path.

When the heating operation signal Sst is set to "1" in the operation ON state of the heating and hot-water supply system 100a, the controller 130 operates the circulation pump 170 and the combustion burner 102 to heat the heating medium and form the above-described heating circulation path. An amount of heat generated by the combustion burner 102 is controlled such that the output temperature Thm of the heating medium coincides with an output target temperature corresponding to a set heating capacity.

Since only the heating operation is executed when the hot-water supply tap (not illustrated) is closed during the heating operation and the detected flow rate Q1 of the flow rate sensor 125 is smaller than a predetermined minimum flow rate, the distribution valve 160 is controlled such that the entire amount of the heating medium flows through the heating circulation path.

On the other hand, when the hot-water supply tap (not illustrated) is opened during the heating operation and the detected flow rate Q1 of the flow rate sensor 125 exceeds the minimum flow rate, a simultaneous operation of heating and hot-water supply is executed. In the simultaneous operation, the distribution valve 160 is controlled such that some of the heating medium after being heated flows through the bypass path in a state in which the circulation pump 170 and the combustion burner 102 are in operation. Thereby, in the hot-water supply heat exchanger 150, low-temperature water introduced into the secondary side path 152 from the water inlet pipe 112 is heated by the heating medium flowing through the primary side path 151.

As a result, high-temperature water heated by the hot-water supply heat exchanger 150 and low-temperature water passed through the bypass pipe 116 can be mixed and supplied with hot water from the hot-water outlet pipe 115. By adjusting the opening degree of the bypass flow valve 120, the hot-water outlet temperature To is controlled to a hot-water supply temperature target value.

In the operation ON state of the heating and hot-water supply system 100a, while the heating operation signal Sst is "0," when the hot-water supply tap (not illustrated) is opened and the detected flow rate Q1 of the flow rate sensor 125 exceeds the minimum flow rate only the hot-water supply operation is executed. Also in the hot-water supply operation, the circulation pump 170 and the combustion burner 102 are operated. Further, the distribution valve 160 is controlled so that the entire amount of the heating medium heated by the heat exchanger 104 flows through the bypass path. An output temperature target value of the heating medium in the hot-water supply operation is preferably set to a value different from that in the heating operation and the simultaneous operation. Also in the hot-water supply operation, the hot-water outlet temperature To is controlled to the hot-water supply temperature target value by adjusting the opening degree of the bypass flow valve 120.

In contrast, in the heating and hot-water supply system 100a, in the operation OFF state, even when the heating operation signal Sst is "1" or when it is detected that the detected flow rate Q1 of the flow rate sensor 125 exceeds the minimum flow rate, the combustion burner 102 is maintained in a stopped state. That is, since the heating medium is not heated, none of the heating operation, the hot-water supply operation, and the simultaneous operation is started. In a configuration in which the heating and hot-water supply system 100a supplies the heating medium to a plurality of heating devices 180, execution and stop of the heating operation described above can be controlled such that the heating operation signal Sst is set to "1" during operation of at least one of the plurality of heating devices 180, and the heating operation signal Sst is set to "0" when all of the heating devices 180 are stopped.

A heating capacity demand with respect to the heating and hot-water supply system 100a according to the present embodiment in the heating operation is input by connection of a predetermined wiring 250 that transmits a heat demand signal to input terminals 211 and 212. The heat demand signal is, for example, a voltage signal having a voltage value in a range of 0 to 10 (V). In the following description, a voltage value of the heat demand signal is denoted by a demand voltage Vhd. That is, the demand voltage Vhd has single polarity (here, a positive voltage). In the present embodiment, the heating demand is higher when the demand voltage Vhd is higher, that is, an increase in temperature of the heating medium output from the heating and hot-water supply system 100a to the heating device 180 is demanded.

When the wiring 250 is connected to the input terminals 211 and 212, an input voltage Vin is generated between the input terminals 211 and 212. However, depending on polarity of the connection between the wiring 250 and the input terminals 211 and 212, there are two types including a case in which Vin=Vhd (hereinafter also referred to as a "positive connection"), and a case in which Vin=−Vhd (hereinafter also referred to as a "negative connection"). That is, in the following example, the positive voltage corresponds to "first polarity" and the negative voltage corresponds to "second polarity." Also, in the following description, a voltage range of Vhd is 0 (GND) to +V1 (V).

The voltage conversion circuit 200 converts the input voltage Vin corresponding to the demand voltage Vhd into a control voltage Vmc input to the controller 130. On the basis of the control voltage Vmc, the controller 130 detects a heating demand from the heating device 180 and sets an output target temperature θset of the heating medium. Then, a generated amount of heat of the combustion burner 102 is controlled so that the output temperature Thm of the heating medium detected by the temperature sensor 124 coincides with the output target temperature θset. In the configuration example of FIG. 1, the combustion burner 102 corresponds to one example of a "heating structure," and the controller 130 corresponds to one example of a "control circuit." In addition, the output target temperature θset of the heating medium corresponds to one example of a "target output of the heating medium." The target output of the heating medium may be set stepwise as a temperature level, rather than a temperature value itself. In the president embodiment, when the target output of the heating medium is set high, an output temperature of the heating medium is increased.

First, with reference to FIG. 2, a configuration of a comparative example of a voltage conversion circuit for coping with both the positive connection and the negative connection described above will be described.

Figure 2:
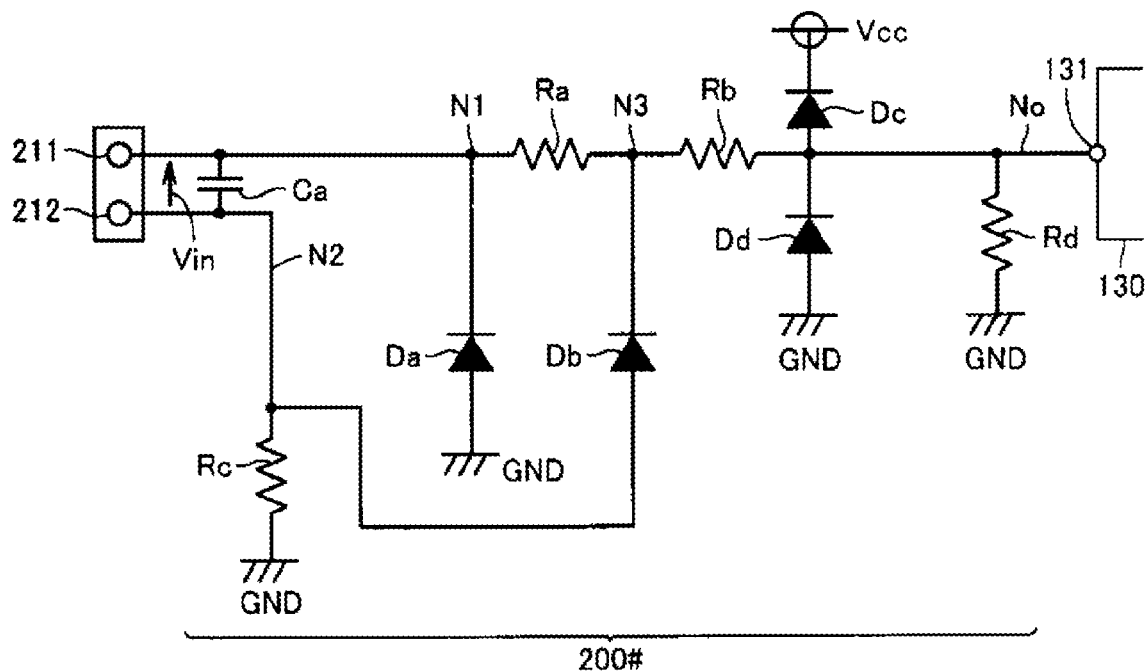
FIG. 2 is a circuit diagram for describing a configuration of a voltage conversion circuit according to a comparative example.

Referring to FIG. 2, a voltage conversion circuit 200# according to the comparative example includes resistance elements Ra to Rd, diodes Da to Dd, and a capacitor Ca. In the following description, for each resistance element, an electric resistance value thereof will be denoted by the same reference sign.

The capacitor Ca is connected between the input terminals 211 and 212. The resistance element Ra is connected between a node N1 and a node N3 which are connected to the input terminal 211. The node N1 is grounded via the diode Da. A node N2 connected to the input terminal 212 is grounded via the resistance element Rc and connected to the node N3 via the diode Db. The diodes Da and Db are connected with polarity such that cathodes thereof are respectively connected to the nodes N1 and N3.

The node N3 is connected to an output node No through which the control voltage Vmc is output via the resistance element Rb. Further, the output node No is connected to a ground voltage via the resistance element Rd. Therefore, the control voltage Vmc is a voltage obtained by dividing a voltage of the node N1 (that is, Vin) by the resistance elements Ra, Rb, and Rd. When the output node No is connected to a port 131 of the controller 130, the control voltage Vmc is input to the controller 130. Further, electric resistance values of the resistance elements Ra, Rb, and Rd are designed such that the divided voltage of a voltage V1 which is a maximum value of the demand voltage Vhd does not exceed a power supply voltage Vcc.

The capacitor Ca is connected between the output node No and a ground node which supplies a ground voltage GND and removes noise from the control voltage Vmc. The diode Dc includes an anode connected to the output node No and a cathode connected to a power supply node which supplies the power supply voltage Vcc. The power supply voltage Vcc has a voltage value common to a power supply voltage of the controller 130. The diode Dd has a cathode connected to the output node No and an anode connected to the ground node.

In the case of the positive connection (Vin=Vhd), since 0≤Vin≤V1, the diodes Da, Db, and Dd are reverse-biased and maintained non-conductive. The control voltage Vmc is set within a range of 0≤Vmc≤Va. Va is expressed by Va=V1·Rx using a voltage division ratio Rx (Rx=Rd/(Ra+Rb+Rd)) according to the resistance elements Ra, Rb, and Rd.

On the other hand, in the case of the negative connection (Vin=Vhd), since −V1≤Vin≤0, the diode Da or Db is electrically conducted. Therefore, when a forward voltage drop due to a diode is ignored, a voltage of the output node No becomes equal to the ground voltage. That is, Vmc=0. Also, when a noise-like high voltage (>Vcc) is input to the node N1, the diode Dc is electrically conducted so that the voltage of the output node No does not rise above the power supply voltage Vcc. Thereby, the controller 130 can be protected from overvoltage input.

Figure 3:
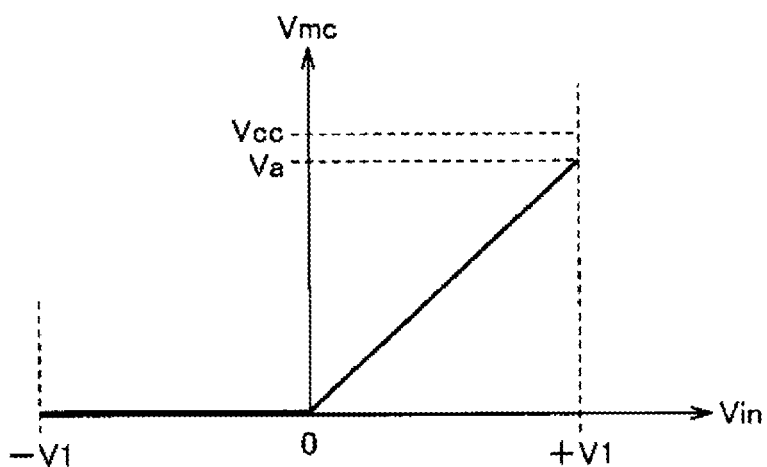
FIG. 3 is a graph showing input/output characteristics of the voltage conversion circuit illustrated in FIG. 2.

FIG. 3 shows input/output characteristics of the voltage conversion circuit 200#, that is, a correspondence relationship of the control voltage Vmc with respect to the input voltage Vin.

Referring to FIG. 3, since the demand voltage Vhd is 0≤Vhd≤V1, the input voltage Vin has a range of −V1≤Vin≤V1 in consideration of both the positive connection and the negative connection.

In the positive voltage range (0≤Vin≤V1) by the positive connection, Vmc=Rx·Vin, and when Vin=V1, Vmc=Va (Va<Vcc). On the other hand, in the negative voltage range (−V1≤Vin≤0) by the negative connection, Vmc=0 due to the diodes Da and Db.

Figure 4:
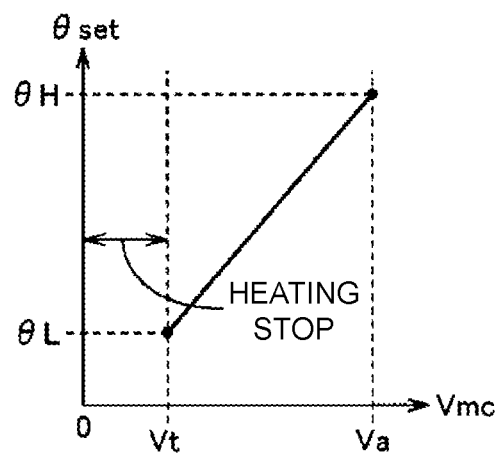
FIG. 4 is a graph for describing setting characteristics of an output target temperature of a heating medium with respect to a control voltage from the voltage conversion circuit illustrated in FIG. 2.

FIG. 4 is a graph showing setting characteristics of the output target temperature θset of the heating medium by the controller 130 with respect to the control voltage Vmc from the voltage conversion circuit 200#. A horizontal axis of FIG. 4 shows a voltage value of the control voltage Vmc input to the controller 130, and a vertical axis thereof shows a temperature value of the output target temperature θset of the heating medium.

Referring to FIG. 4, in a range in which the control voltage Vmc is lower than a predetermined threshold value Vt (Vmc<Vt), it is recognized that a heating demand is small, the combustion burner 102 is stopped, and thus heating of the heating medium is stopped. On the other hand, in a range of Vt≤Vmc≤Va, the output target temperature θset is set according to Vmc. Specifically, when Vmc=Vt, the output target temperature θset is set to a lower limit temperature θL, whereas when Vmc=Va, the output target temperature θset is set to an upper limit temperature θH. In the range of Vt<Vmc<Va, the output target temperature θset is set according to a linear function of the control voltage Vmc.

According to such a comparative example, even when the heat demand signal is input with negative connection, the heating and hot-water supply system 100a can be operated without the controller 130 perceiving the input voltage (control voltage Vmc) as an abnormal value.

On the other hand, in the case of the negative connection, since Vmc=0, that is, Vmc<Vt, is fixed, unnecessary heating when the demand voltage Vhd is low can be excluded, and the stop of the heating is maintained even when the demand voltage Vhd is high and thus a heating demand is high.

Particularly, in the case of Vmc<Vt, the controller 130 cannot distinguish whether the demand voltage Vhd is low under the positive connection or it is caused by the negative connection. Therefore, there is concern of an inappropriate operation situation in which the demand voltage Vhd is high while the negative connection is not perceived and a heating stop state of the heating medium may continue for a long time even when a heating demand is genuinely high.

Therefore, in the heat source device for heating according to the present embodiment, a voltage conversion circuit is configured as described below.

Figure 5:
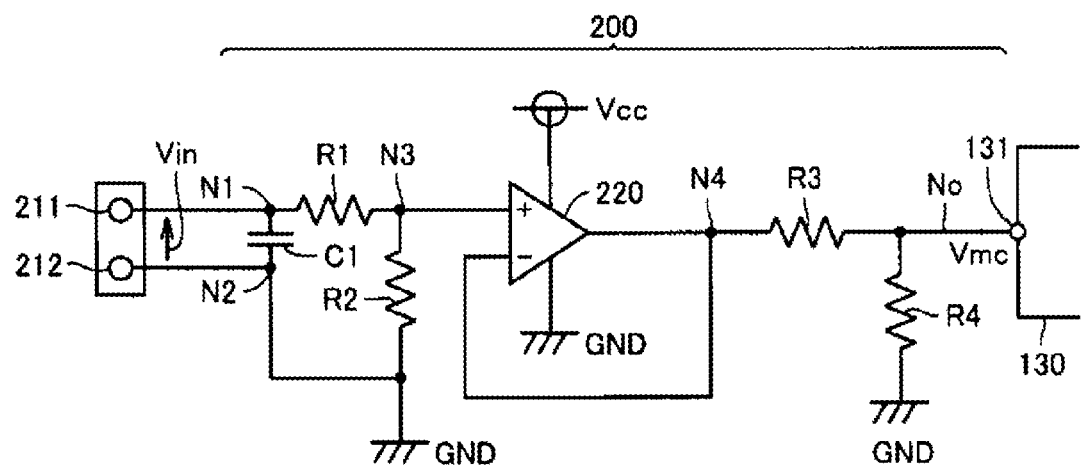
FIG. 5 is a circuit diagram for describing a configuration of a voltage conversion circuit according to the first embodiment.

FIG. 5 is a circuit diagram for describing a configuration of a voltage conversion circuit 200 according to a first embodiment.

Referring to FIG. 5, the voltage conversion circuit 200 includes resistance elements R1 to R4, an operational amplifier 220, and a capacitor C1. Also in the following description, electric resistance values of the resistance elements R1 to R4 are denoted by R1 to R4.

Referring to FIG. 5, nodes N1 and N2 are connected to the input terminals 211 and 212. As in the capacitor Ca in FIG. 2, a capacitor C1 is connected between the nodes N1 and N2. The resistance element R1 is connected between nodes N1 and N3, and the resistance element R2 is connected between the nodes N3 and N2. The node N2 is connected to the ground node (GND), and the node N3 is connected to a non-inverting input terminal (+ terminal) of an operational amplifier 220. That is, a divided voltage of the input voltage Vin by the resistance elements R1 and R2 is input to the non-inverting input terminal (+ terminal) of the operational amplifier 220.

As in the controller 130, the operational amplifier 220 operates by receiving the power supply voltage Vcc and the ground voltage GND. A node N4 is connected to an output terminal and an inverting input terminal (− terminal) of the operational amplifier 220. Thereby, a so-called voltage follower circuit (amplification factor 1.0) is configured by the operational amplifier 220. Therefore, a voltage of the node N4 becomes the same as that of the node N3.

The resistance element R3 is connected between the node N4 and an output node No, and the resistance element R4 is connected between the output node No and the ground node. The output node No is connected to the port 131 of the controller 130. A voltage obtained by dividing the voltage of the node N4 by the resistance elements R3 and R4 is output to the output node No as the control voltage Vmc.

Therefore, when a voltage division ratio Rk1 (Rk1=R2/(R1+R2)) by the resistance elements R1 and R2 and a voltage division ratio Rk2 (Rk2=R4/(R3+R4)) by the resistance elements R3 and R4 are used, the control voltage Vmc is expressed by the following Expression (1).

$$Vmc=Vin \cdot Rk1 \cdot Rk2 \quad (1)$$

The voltage division ratios Rk1 and Rk2 are adjusted so that Vb<Vcc is satisfied in Vmc=Vb (Vb=Rk1·Rk2·V1) when Vin=V1 (a maximum value of the demand voltage Vhd). As a result, the controller 130 can be protected from overvoltage input.

Therefore, when the heat demand signal is input with positive connection (Vin=Vhd), the voltage conversion circuit 200 can convert the input voltage Vin to the control voltage Vmc so that a voltage value of the control voltage Vmc increases as the demand voltage Vhd increases. On the other hand, when the heat demand signal is input with negative connection (Vin=−Vhd), a negative voltage is input to the non-inverting input terminal (+ voltage) of the operational amplifier 220. That is, a voltage outside an operating power supply voltage range (here, GND to Vcc) is input to the operational amplifier.

Normally, an operational amplifier is configured to output a predetermined one of the power supply voltage Vcc and the ground voltage GND when a voltage outside the operating power supply voltage range is input. In the voltage conversion circuit 200, a type that outputs the power supply voltage Vcc when a negative voltage is input is applied as the operational amplifier 220.

In this way, in the case of negative connection, since the power supply voltage Vcc is fixedly output to the node N4, the control voltage Vmc is fixed to Vmc=Vc. Here, Vc is expressed by Vc=Vcc·Rk2 using the voltage division ratio Rk2 by the resistance elements R3 and R4. In this manner, the voltage conversion circuit 200 receives the ground voltage GND (0 (V)) and the power supply voltage Vcc, and outputs the control voltage Vmc as a positive voltage (strictly speaking, Vmc≥0 (V)). Therefore, the positive connection is a connection mode in which polarity of the input voltage Vin is the same as polarity of the control voltage Vmc. Similarly, the negative connection is a connection mode in which polarity of the input voltage Vin and polarity of the control voltage Vmc are different.

Figure 6:
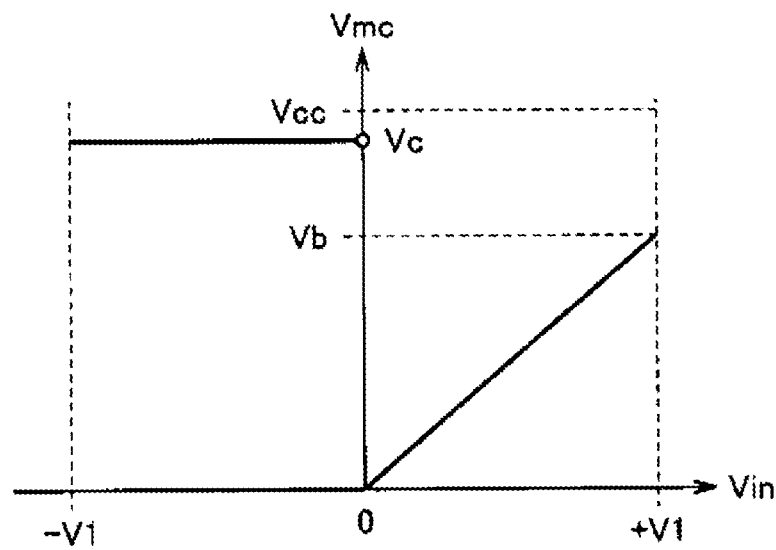
FIG. 6 is a graph showing input/output characteristics of the voltage conversion circuit according to the first embodiment.

FIG. 6 shows input/output characteristics of the voltage conversion circuit 200 according to the first embodiment, that is, a correspondence relationship of the control voltage Vmc with respect to the input voltage Vin.

Referring to FIG. 6, in a voltage range of Vin (−V1≤Vin≤V1) when both the positive connection and the negative connection are considered, Vmc=Vin·Rk1·Rk2 in the positive voltage range (0≤Vin≤V1) due to positive connection. Since Vin=Vhd, the control voltage Vmc has a voltage value that rises as the demand voltage Vhd increases. Particularly, Vmc=Vb when Vin=V1 (Vb<Vcc).

On the other hand, since the output voltage of the operational amplifier 220 is fixed to the power supply voltage Vcc in the negative voltage range (−V1≤Vin≤0) due to a negative connection, the control voltage is fixed to Vmc=Vc (Vc=Vcc·Rk2). Here, the voltage division ratios Rk1 and Rk2 are adjusted such that Vb (Vb=V1·Rk1·Rk2) satisfies Vb<Vc in addition to the Vb<Vcc described above. Electric resistance values of the resistance elements R1 to R4 are selected so that such voltage division ratios Rk1 and Rk2 can be obtained.

As a result, in the voltage conversion circuit 200, regardless of whether the input voltage Vin is in the negative voltage range (−V1≤Vin≤0) or in the positive voltage range (0≤Vin≤V1), the control voltage Vmc is in the positive voltage range. Further, it is understood that a range of the control voltage Vmc (Vmc=Vc) into which the input voltage Vin of the negative voltage range (−V1≤Vin≤0) is converted and a range of the control voltage Vmc (0<Vmc≤Vb) into which the input voltage Vin of the positive voltage range (0<Vin≤V1) is converted do not overlap in the voltage range (Vmc≥0) in which a negative voltage is not included. The controller 130 sets the output target temperature θset of the heating medium as shown in FIG. 7 on the basis of the control voltage Vmc from the voltage conversion circuit 200 as described above.

Figure 7:
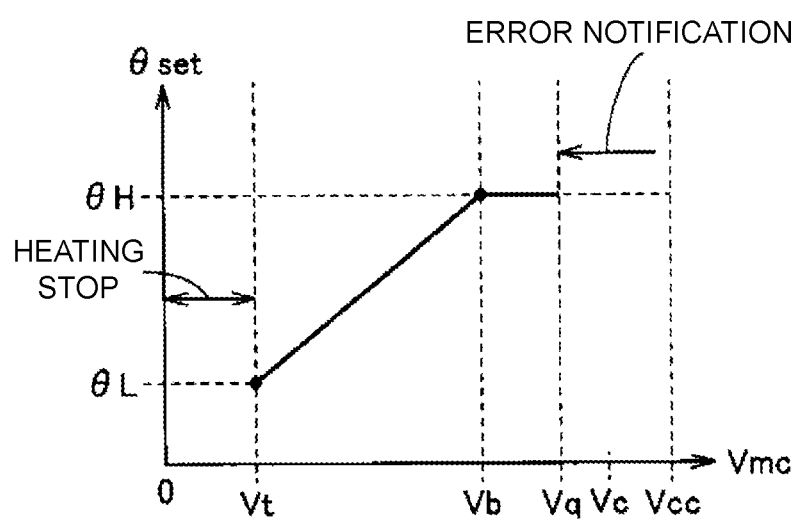
FIG. 7 is a graph for describing setting characteristics of an output target temperature of a heating medium with respect to a control voltage from the voltage conversion circuit according to the first embodiment.

Referring to FIG. 7, in the range of the control voltage (0≤Vmc≤Vb) corresponding to the positive voltage range (0≤Vin≤V1) of the input voltage Vin, the output target temperature θset is set as in 0≤Vmc≤Va of FIG. 4. That is, when Vmc<Vt, heating of the heating medium is stopped. On the other hand, when Vmc=Vt, the output target temperature θset is set to a lower limit temperature θL. Further, when Vmc=Vb, the output target temperature θset is set to an upper limit temperature θH, and in the range of Vt<Vmc<Vb, the output target temperature θset is set according to a linear function having Vmc as a variable. That is, it is possible to set the output target temperature θset of the heating medium in correspondence with the heat demand signal (demand voltage Vhd).

Further, when the control voltage Vmc is higher than a determination voltage Vq(Vb<Vq<Vc) set between Vb and Vc (Vmc>Vq), the controller 130 can detect that Vmc=Vc, that is, the heat demand signal is via a negative connection. For example, when the negative connection is detected, the controller 130 stops the heating as in the comparative example and can output a message or an error code prompting a user to correct the negative connection. For example, the message can be output in such a manner that the user can visually recognize it using the display part 310 of the remote controller 300. That is, the display part 310 corresponds to one embodiment of a "notification part." Alternatively, it is also possible to output the message by voice to the user using a speaker (not illustrated) provided in the remote controller 300 as a "notification part."

As a result, in the heating and hot-water supply system having a voltage conversion circuit according to the first embodiment, the user or a service person can correct input polarity of the heat demand signal to the input terminals 211 and 212, that is, polarity of the connection of the wiring 250, according to a message or an error code. Therefore, it is possible to avoid an inappropriate operation situation in which a heating stop state of the heating medium continues for a long time even though the demand voltage Vhd is high while the negative connection of the heat demand signal is not perceived by the user as in the comparative example.

Modified Example of First Embodiment

Figure 8:
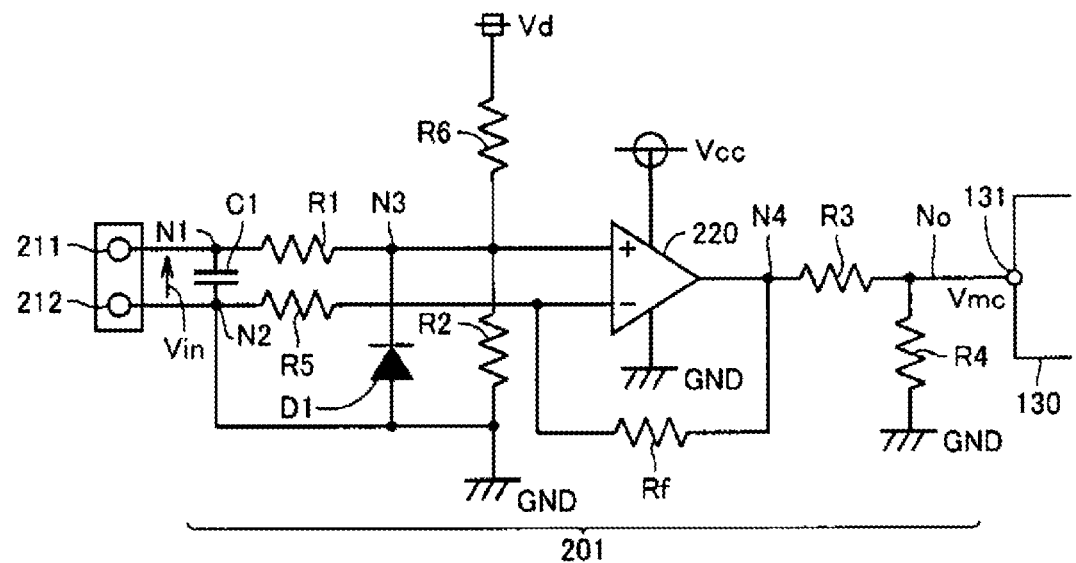
FIG. 8 is a circuit diagram for describing a configuration of a voltage conversion circuit according to a modified example of the first embodiment.

FIG. 8 illustrates a configuration of a voltage conversion circuit 201 according to a modified example of the first embodiment. In the modified example of the first embodiment, the voltage conversion circuit 200 in the configuration of FIG. 1 is replaced with the voltage conversion circuit 201 (FIG. 8), and the control voltage Vmc from the voltage conversion circuit 201 is input to the controller 130.

Referring to FIG. 8, in addition to resistance elements R1 to R4, an operational amplifier 220, and a capacitor C1 as those in the voltage conversion circuit 200 illustrated in FIG. 5, the voltage conversion circuit 201 according to the modified example of the first embodiment includes resistance elements R5, R6 and Rf, and a diode D1.

The resistance element R5 is connected between a node N2 and an inverting input terminal (− terminal) of the operational amplifier 220. The diode D1 includes a cathode connected to a node N3 and an anode connected to the ground node. The resistance element Rf is connected between an output terminal (node N4) of the operational amplifier 220 and the inverting input terminal (− terminal) of the operational amplifier 220. Further, the resistance element R6 is input between a power supply node supplying a power supply voltage Vd (Vd>Vcc) and the node N3.

The operational amplifier 220 constitutes a differential amplifier circuit having an amplification factor Am determined by the electric resistance values of the resistance elements R1, R2, R5, and Rf according to the resistance element Rf serving as a feedback resistor.

In the voltage conversion circuit 201, an input voltage to the operational amplifier 220, that is, a voltage of the node N3, is offset by a voltage Vof obtained by dividing the power supply voltage Vd by the resistance elements R2 and R6. It is expressed by Vof=Vd·R2/(R2+R6). Therefore, a voltage that the operational amplifier 220 outputs to the node N4 is expressed by Am·(Vin+Vof) for the input voltage Vin in a range of −V1≤Vin≤V1. Further, the output voltage from the operational amplifier 220 is divided by the resistance elements R3 and R4 (voltage division ratio Rk2), and the control voltage Vmc is generated.

Figure 9:
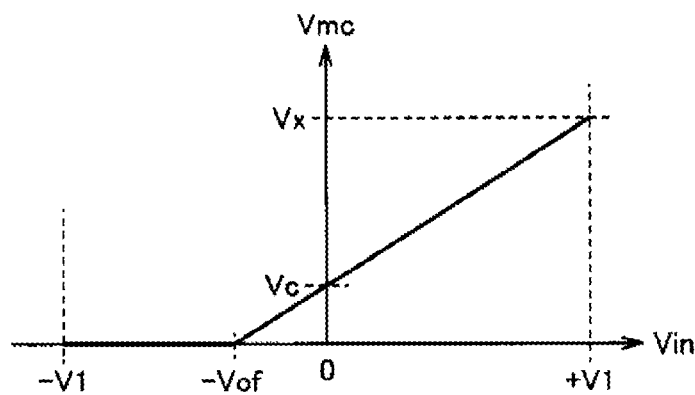
FIG. 9 is a graph showing input/output characteristics of the voltage conversion circuit according to the modified example of the first embodiment.

FIG. 9 shows input/output characteristics of the voltage conversion circuit 201, that is, a correspondence relationship of the control voltage Vmc with respect to the input voltage Vin.

Referring to FIG. 9, even in a case of Vin=0 in the voltage conversion circuit 201, Vmc=Vc due to presence of the offset voltage. Here, it is expressed by Vc=Vof·Am·Rk2. Also, when Vin=V1, Vmc=Vx. Vx is expressed by Vx=(V1+Vof)·Am·Rk2 using the amplification factor Am and the voltage division ratio Rk2. The amplification factor Am and the voltage division ratio Rk2 are designed to be at least Vx<Vcc.

That is, in the positive voltage range (0≤Vin≤V1) of the input voltage Vin, the control voltage Vmc is set to have a high voltage value according to the rise of the input voltage Vin in a voltage range of Vc≤Vmc≤Vx.

On the other hand, in the negative voltage range (−V1≤Vin≤0) of the input voltage Vin, the control voltage Vmc is a positive voltage lower than Vc in a range of Vin>−Vof in which the node N3 is a positive voltage. In contrast, in a range of Vin<−Vof, the node N3 is a negative voltage, thereby the diode D1 is electrically conducted, and the ground voltage (GND) is input to the non-inverting input terminal (+ terminal) of the operational amplifier 220. Therefore, in this range, the control voltage is fixed as Vmc=0. In practice, the control voltage Vmc is fixed to a very small positive voltage due to an influence of the forward voltage drop by the diode D1, but it is expressed as Vmc=0 in FIG. 9.

Also in the input/output characteristics of FIG. 9, it is understood that a range of the control voltage Vmc (0<Vmc≤Vc) into which the input voltage Vin of the negative voltage range (−V1≤Vin≤0) is converted and a range of the control voltage Vmc (0<Vmc≤Vb) into which the input voltage Vin of the positive voltage range (0<Vin≤V1) is converted do not overlap in the voltage range (Vmc≥0) in which a negative voltage is not included.

Figure 10:
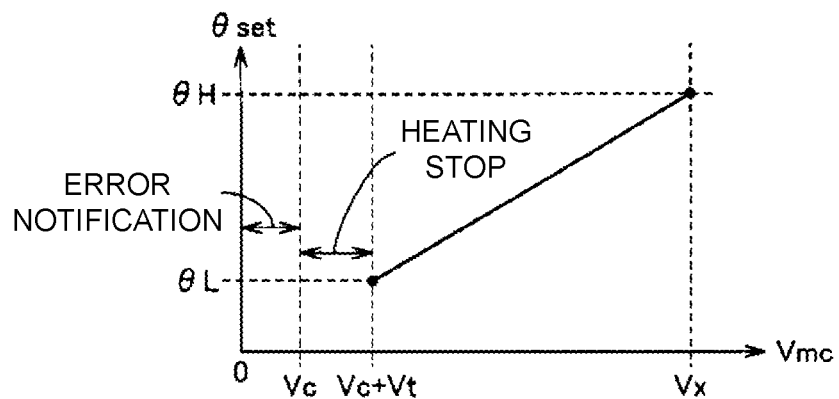
FIG. 10 is a graph for describing setting characteristics of an output target temperature of a heating medium with respect to a control voltage from the voltage conversion circuit according to the modified example of the first embodiment.

On the basis of the control voltage Vmc from the voltage conversion circuit 201 as described above, the controller 130 sets the output target temperature θset of the heating medium as shown in FIG. 10.

Referring to FIG. 10, in a range of the control voltage (Vc≤Vmc≤Vb) corresponding to the positive voltage range (0≤Vin≤V1) of the input voltage Vin, while the heating of the heating medium is stopped when Vmc<Vc+Vt, the output target temperature θset is set to the lower limit temperature θL when Vmc=Vc+Vt, and the output target temperature θset is set to the upper limit temperature θH when Vmc=Vx. Further, in a range of Vc+Vt<Vmc<Vx, it is possible to set the output target temperature θset according to a linear function with Vmc as a variable. That is, the output target temperature θset of the heating medium can be set corresponding to the heat demand signal (demand voltage Vhd).

In contrast, in a range of the control voltage (0≤Vmc≤Vc) corresponding to the negative voltage range (−V1≤Vin≤0) of the input voltage Vin, as in the range of Vmc>Vq in FIG. 7, it can be detected that the heat demand signal is via a negative connection. Therefore, when the negative connection is detected, as in the first embodiment, the controller 130 can stop the heating of the heating medium and output a message or an error code prompting the user to correct the negative connection.

As described above, also in the heating and hot-water supply system having the voltage conversion circuit according to the modified example of the first embodiment, since it is possible to detect the negative connection of the heat demand signal and output a message or an error code, it is possible to avoid an inappropriate operation situation in which a heating stop state of the heating medium continues for a long time even though the demand voltage Vhd is high while the negative connection is not perceived by the user.

Further, since the control voltage Vmc at the time of negative connection is positioned on a side instructing the heating stop, when compared with the first embodiment (FIG. 7) in which the control voltage Vmc at the time of the negative connection is positioned on a high temperature region side of the output target temperature θset, it is possible to realize control on a safer side that inhibits a possibility of malfunction of heating.

Second Embodiment

In the first embodiment and its modified example, a configuration example in which heating is stopped and a message prompting correction of the negative connection is output when a heat demand signal is input with negative connection has been described. In contrast, in the second embodiment, a configuration for setting an output target temperature θset of a heating medium corresponding to a heat demand signal (demand voltage Vhd) regardless of positive connection and negative connection will be described.

Figure 11:
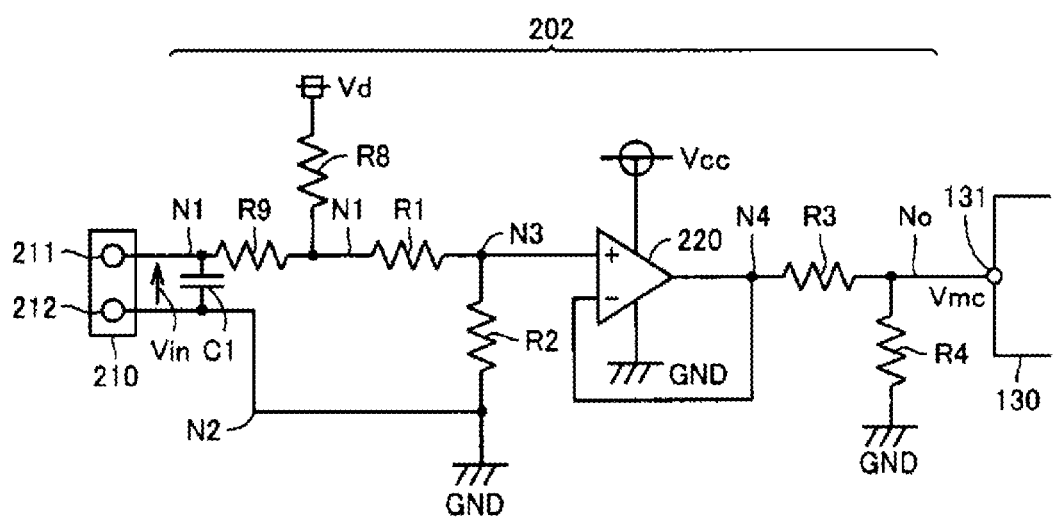
FIG. 11 is a circuit diagram for describing a configuration of a voltage conversion circuit according to a second embodiment.

FIG. 11 is a circuit diagram for describing a configuration of a voltage conversion circuit 202 according to the second embodiment. In the second embodiment, the voltage conversion circuit 200 in the configuration of FIG. 1 is replaced with the voltage conversion circuit 202 (FIG. 11), and a control voltage Vmc from the voltage conversion circuit 202 is input to the controller 130.

Referring to FIG. 11, the voltage conversion circuit 202 is different from the voltage conversion circuit 200 (FIG. 5) according to the first embodiment in that resistance elements R8 and R9 are further provided. Since other configurations are the same as those in the first embodiment, the detailed description thereof will not be repeated.

The resistance element R9 is connected between an input terminal 211 and a node N1. The resistance element R8 is connected between a voltage node that outputs a power supply voltage Vd and the node N1. As a result, an offset voltage Vof obtained by dividing the power supply voltage Vd by the resistance elements R8 and R9 is always applied to the node N1. That is, a voltage of the node N1 is Vin+Vof. Further, it is expressed as Vof=Vd·R9/(R8+R9).

A voltage obtained by dividing the voltage (Vin+Vof) of the node N1 by resistance elements R1 and R2 (voltage division ratio Rk1) is output to a node N3. A voltage equivalent to that of the node N3, that is, Rk1·(Vin+Vof), is output to a node N4 by a voltage follower circuit using an operational amplifier 220. Further, by dividing the voltage of the node N4 by resistance elements R3 and R4 (voltage division ratio Rk2), the control voltage Vmc according to Equation (2) is output to the output node No.

$$Vmc = Rk1 \cdot Rk2 \cdot (Vin+Vof) \qquad (2)$$

Figure 12:
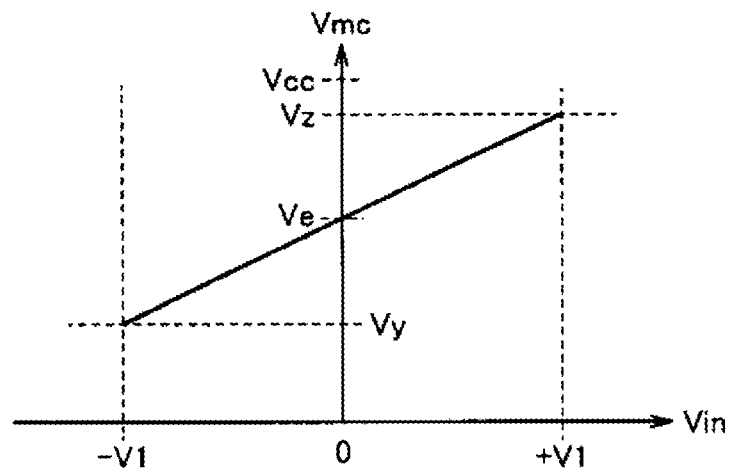
FIG. 12 is a graph showing input/output characteristics of the voltage conversion circuit according to the second embodiment.

FIG. 12 shows input/output characteristics of the voltage conversion circuit 202 according to the second embodiment, that is, a correspondence relationship of the control voltage Vmc with respect to the input voltage Vin.

Referring to FIG. 12, the offset voltage Vof is set such that the voltage (Vin+Vof) of the node N1 is a positive voltage, that is, Vof>V1, even when Vin=−V1 at the time of negative connection.

Therefore, also in a negative voltage range (−V1≤Vin≤0) due to negative connection of the input voltage Vin, the control voltage Vmc is a positive voltage. Specifically, when Vin=−V1, Vmc=Vy (Vy>0), and when Vin=0, Vmc=Ve. Ve which is a voltage value of the control voltage Vmc when Vin=0 is also referred to as a reference voltage Ve below. Further, in a positive voltage range of the input voltage Vin (0≤Vin≤V1), the control voltage Vmc is set within a voltage range of Ve to Vz.

When the voltage division ratios Rk1 and Rk2 are used, Vy=Rk1·Rk2·(Vof−V1), Ve=Rk1·Rk2·Vof, and Vz=Rk1·Rk2·(Vof+V1). The voltage division ratios Rk1 and Rk2, that is, the resistance elements R1 to R4, are selected so that Vz<Vcc.

In this way, in the voltage conversion circuit 202, the control voltage Vmc is converted according to a linear function of the input voltage Vin in the voltage range (−V1≤Vin≤V1) of the input voltage Vin in which voltage ranges of the negative connection and the positive connection are combined. Also in the input/output characteristic of FIG. 12, it is understood that a range of the control voltage Vmc (Vy≤Vmc<Ve) into which the input voltage Vin of the negative voltage range (−V1≤Vin<0) is converted and a range of the control voltage Vmc (Ve<Vmc≤Vz) into which the input voltage Vin of the positive voltage range (0<Vin≤V1) is converted do not overlap in the voltage range (Vmc≥0) in which a negative voltage is not included.

Figure 13:
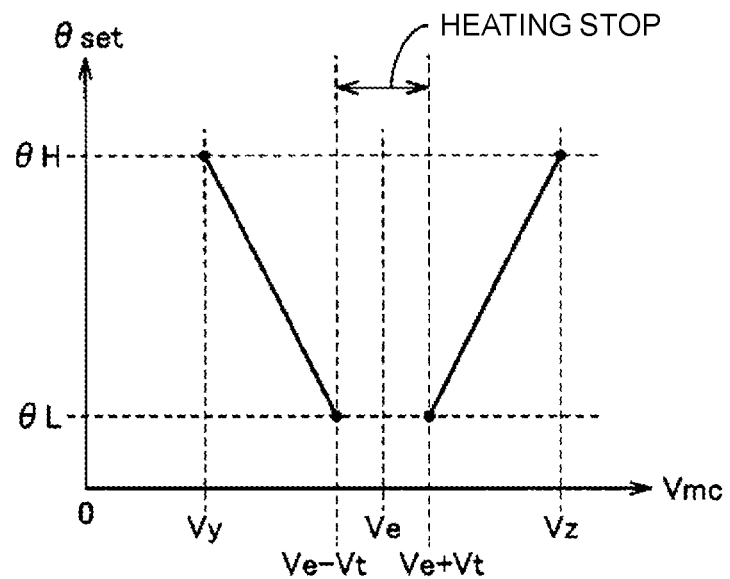
FIG. 13 is a graph showing setting characteristics of an output target temperature of a heating medium with respect to a control voltage from the voltage conversion circuit according to the second embodiment.

On the basis of the control voltage Vmc from the voltage conversion circuit 202, the controller 130 sets the output target temperature θset of the heating medium as shown in FIG. 13.

Referring to FIG. 13, the output target temperature θset of the heating medium is set according to a voltage difference |Vmc−Ve| between the control voltage Vmc and the reference voltage Ve. This voltage difference |Vmc−Ve| is proportional to the demand voltage Vhd regardless of whether the input voltage Vin is positive or negative.

Specifically, in a voltage range of |Vmc−Ve|<Vt, that is, in a voltage range of Ve−Vt<Vmc<Ve+Vt, heating of the heating medium is stopped, and it is set as θset=θL when Vmc=Ve−−Vt or Ve+Vt. Further, it is set as θset=θH when Vmc=Vy or Vz in which |Vmc−Ve| becomes its maximum value.

In a voltage range of Vy<Vmc<Ve−Vt or Ve+Vt<Vmc<Vz, the output target temperature θset of the heating medium is set according to a linear function having the control voltage Vmc as a variable so that the θset becomes higher as the voltage difference |Vmc−Ve| becomes larger.

As described above, in the heating and hot-water supply system having the voltage conversion circuit according to the second embodiment, regardless of whether the heat demand signal is input via a positive connection or a negative connection, that is, regardless of polarity of the input voltage Vin, it is possible to set the output target temperature θset of the heating medium corresponding to the voltage value (demand voltage Vhd) of the heat demand signal.

Modified Example of Second Embodiment

Figure 14:
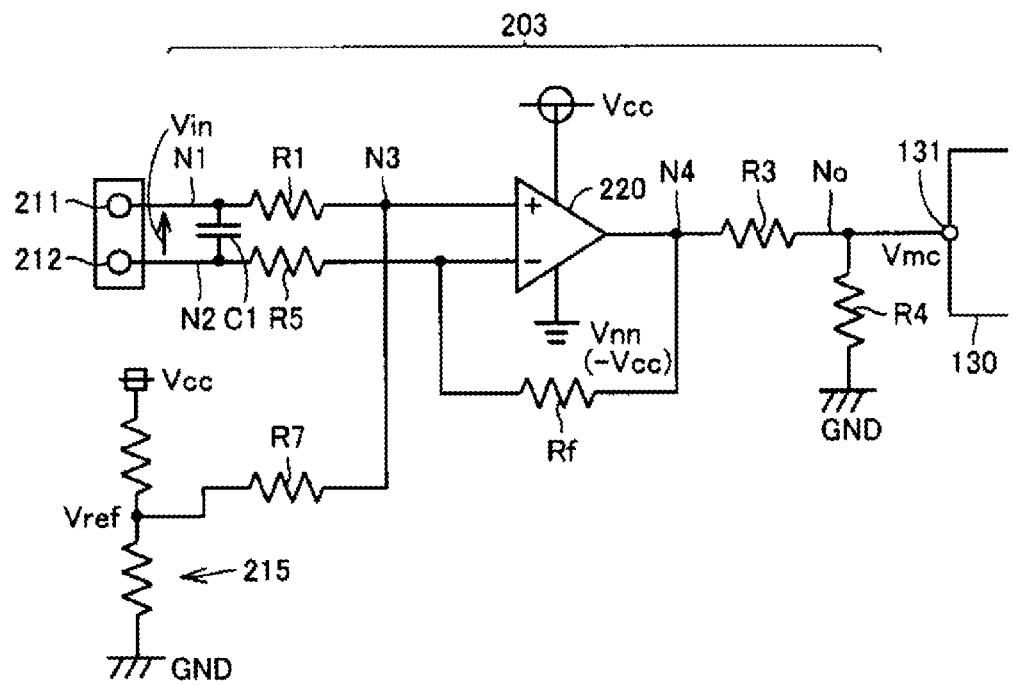
FIG. 14 is a circuit diagram for describing a configuration of a voltage conversion circuit according to a modified example of the second embodiment.

FIG. 14 is a circuit diagram for describing a configuration of a voltage conversion circuit 203 according to a modified example of the second embodiment. In the modified example of the second embodiment, the voltage conversion circuit 200 in the configuration of FIG. 1 is replaced with the voltage conversion circuit 203 (FIG. 14), and a control voltage Vmc from the voltage conversion circuit 203 is input to the controller 130.

Comparing FIG. 14 with FIG. 5, in the voltage conversion circuit 203 according to the modified example of the second embodiment, in addition to resistance elements R1, R3, R4, an operational amplifier 220, and a capacitor C1 as those in the first embodiment, resistance elements R5, R7, Rf and a reference voltage (Vref) generating circuit 215 are further disposed.

The resistance element R5 is connected between a node N2 and an inverting input terminal (− terminal) of the operational amplifier 220. The resistance element Rf is connected between an output terminal (node N4) of the operational amplifier 220 and the inverting input terminal (− terminal) of the operational amplifier 220.

The reference voltage generating circuit 215 generates the reference voltage Vref obtained by dividing the power supply voltage Vd. The resistance element R7 is connected to a transmission path of the reference voltage Vref from the reference voltage generating circuit 215 to a node N3. Further, the operational amplifier 220 operates by being supplied with a power supply voltage Vcc and a negative voltage Vnn (Vnn=−Vcc). Therefore, an output voltage to the node N4 by the operational amplifier 220 can change within a range of −Vcc to Vcc.

Thus, a differential amplifier circuit having an amplification factor according to a resistance ratio (R5/Rf) and a resistance ratio (R1/R7) is configured with the operational amplifier 220. Here, (R5/Rf)=(R1/R7)=A0 (amplification factor). That is, on the basis of the input voltage Vin in a range of −V1≤Vin≤V1, the operational amplifier 220 outputs a voltage expressed by A0·Vin+Vref to the node N4. Further, the output voltage from the operational amplifier 220 is divided by the resistance elements R3 and R4 (voltage division ratio Rk2), and the control voltage Vmc is generated.

Figure 15:
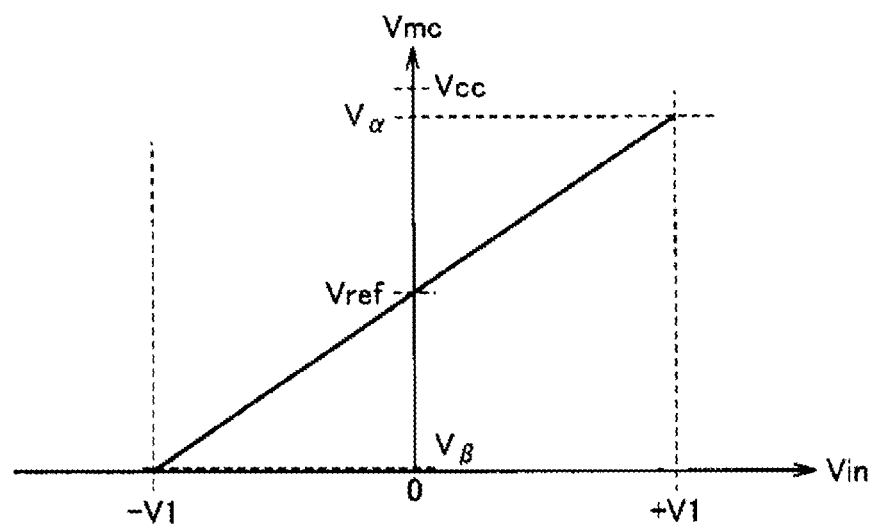
FIG. 15 is a graph showing input/output characteristics of the voltage conversion circuit according to the modified example of the second embodiment.

FIG. 15 shows input/output characteristics of the voltage conversion circuit 203 according to the modified example of the second embodiment, that is, a correspondence relationship of the control voltage Vmc with respect to the input voltage Vin.

Referring to FIG. 15, the reference voltage Vref is set so that the control voltage Vmc does not become a negative voltage, that is, Vref≥V1·A0, even when Vin=−V1 at the time of negative connection. By setting Vref=V1·A0, a variation range of the control voltage Vmc can be secured to the maximum.

Therefore, also in the negative voltage range (−V1≤Vin≤0) due to negative connection of the input voltage Vin, the control voltage Vmc is a ground voltage (GND) or a positive voltage. Specifically, Vmc=Vβ(Vβ≥0) when Vin=−V1, and Vmc=Vref when Vin=0. Further, in the positive voltage range of the input voltage Vin (0≤Vin≤V1), the control voltage Vmc changes within a voltage range of Vref to Vα.

When the voltage division ratio Rk2 is used, Vβ=Rk2·(A0·V1+Vref), and Vα=Rk2·(A0·V1+Vref). The voltage division ratio Rk2, that is, the resistance elements R3 and R4, are selected so that Vα<Vcc.

In this way, in the voltage conversion circuit 203, the control voltage Vmc is converted according to a linear function of the input voltage Vin in the voltage range (−V1≤Vin≤V1) of the input voltage Vin in which voltage ranges of the negative connection and the positive connection are combined. Also in the input/output characteristic of FIG. 13, it is understood that a range of the control voltage Vmc (Vβ≤Vmc<Vref) into which the input voltage Vin of the negative voltage range (−V1≤Vin<0) is converted and a range of the control voltage Vmc (Vref<Vmc≤Vα) into which the input voltage Vin of the positive voltage range (0<Vin≤V1) is converted do not overlap in the voltage range (Vmc≥0) in which a negative voltage is not included.

Figure 16:
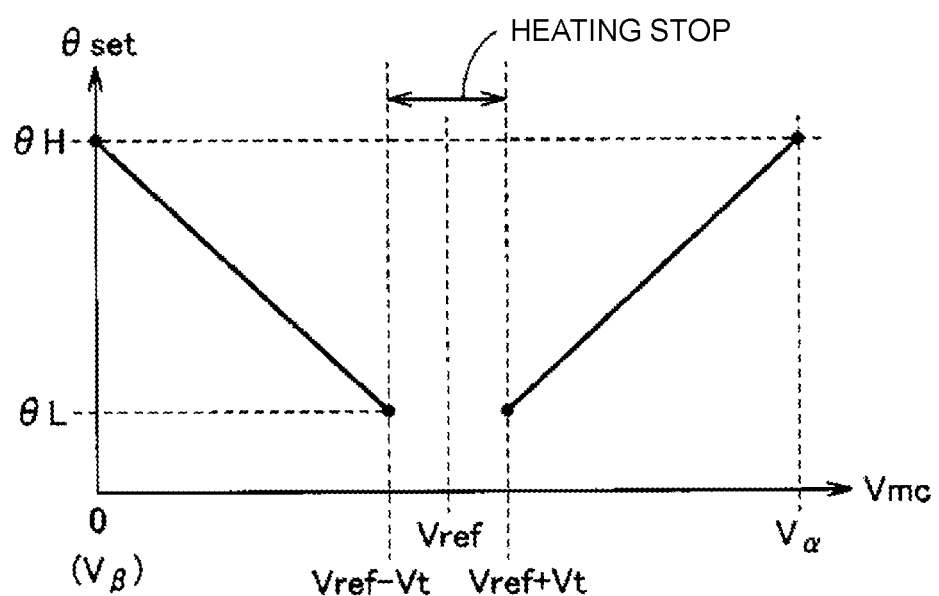
FIG. 16 is a graph showing setting characteristics of an output target temperature of a heating medium with respect to a control voltage from the voltage conversion circuit according to the modified example of the second embodiment.

On the basis of the control voltage Vmc from the voltage conversion circuit 203, the controller 130 sets the output target temperature θset of the heating medium as shown in FIG. 16.

Referring to FIG. 16, the output target temperature θset of the heating medium is set according to a voltage difference |Vmc−Vref| between the control voltage Vmc and the reference voltage Vref. This voltage difference |Vmc−Vref| is proportional to the demand voltage Vhd regardless of whether the input voltage Vin is positive or negative.

Specifically, in a voltage range of |Vmc−Vref|<Vt, that is, in a voltage range of Vref−Vt<Vmc<Vref+Vt, heating of the heating medium is stopped, and it is set as θset=θL when Vmc=Vref−Vt or Vref+Vt. Further, it is set as θset=θH when Vmc=Vα or Vβ in which |Vmc−Vref| becomes its maximum value.

In a voltage range of Vβ<Vmc<Vref−Vt or Vref+Vt<Vmc<Vα, the output target temperature θset of the heating medium is set according to a linear function having the control voltage Vmc as a variable so that the θset becomes higher as the voltage difference |Vmc−Vref| becomes larger.

As described above, in the heating and hot-water supply system having the voltage conversion circuit according to the modified example of the second embodiment, regardless of whether the heat demand signal is input via a positive connection or a negative connection, that is, regardless of polarity of the input voltage Vin, it is possible to set the output target temperature θset of the heating medium corresponding to the voltage value (demand voltage Vhd) of the heat demand signal.

Further, while it is necessary to supply a negative voltage to the operational amplifier 220, since the range of the control voltage Vmc can be easily enlarged, securing the resolution in setting the output target temperature θset of the heating medium with respect to the demand voltage Vhd becomes easier.

The heat source device for heating according to the present embodiment may not have the hot-water supply function as illustrated in FIG. 1, and may be a system dedicated to the heating function.

Figure 17:
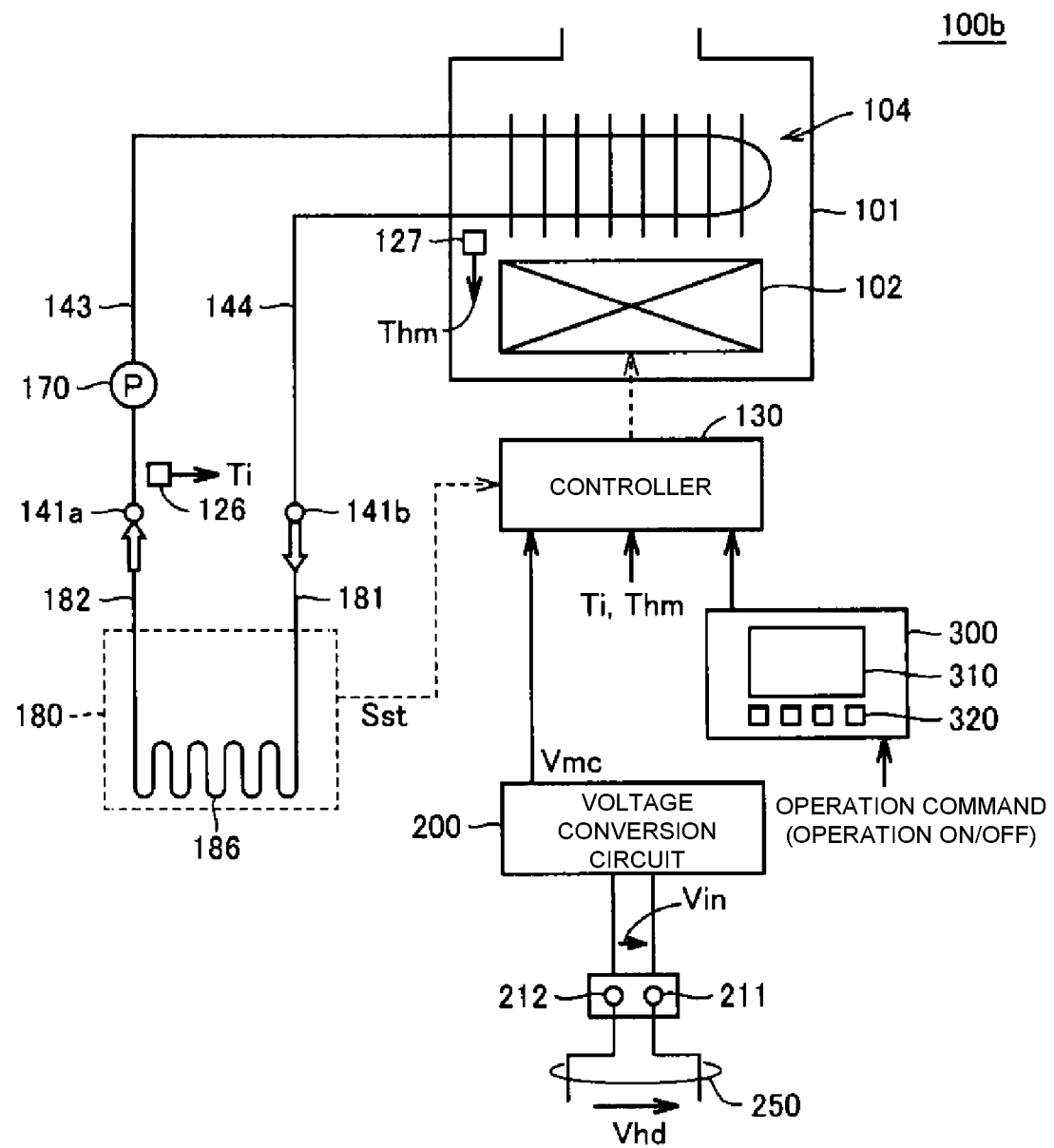
FIG. 17 is a block diagram for describing another configuration example of the heat source device for heating according to the embodiment of the present disclosure.

FIG. 17 is a block diagram for describing another configuration example of the heat source device for heating according to the embodiment of the present disclosure.

Comparing FIG. 17 with FIG. 1, a dedicated water heater for heating 100b has only a configuration related to a heating function in the heating and hot-water supply system 100a, that is, a configuration for circulating the heating medium between the dedicated water heater for heating 100b and the heating device 180 (a heating circulation path).

Specifically, in the dedicated water heater for heating 100b, arrangements of the hot-water supply heat exchanger 150, the distribution valve 160, the pipes 145 to 147, the water inlet pipe 112, the hot-water outlet pipe 115, the bypass pipe 116, and the bypass flow valve 120 are omitted from the heating and hot-water supply system 100a illustrated in FIG. 1. That is, in the dedicated water heater for heating 100b, when the circulation pump 170 is operated, a heating circulation path can be formed between the input end 141a and the output end 141b using the pipe 143, the heat exchanger 104, and the pipe 144.

The input temperature Ti and the output temperature Thm of the heating medium which are detected by the temperature sensors 126 and 127, and operation commands related to the heating function input to the remote controller 300 are input to the controller 130. The operation commands include an operation ON/OFF command for switching between an operation ON state and an operation OFF state of the dedicated water heater for heating 100b. Further, the heating operation signal Sst from the heating device 180 which is set as in FIG. 3 is input to the controller 130.

When the heating operation signal Sst is set to "1" in the operation ON state of the dedicated water heater for heating 100b, the controller 130 operates the circulation pump 170 and the combustion burner 102. As a result, the heated heating medium flows through the heating circulation path, thereby the heating operation is executed. In the heating operation, an amount of heat generated by the combustion burner 102 is controlled such that the output temperature Thm of the heating medium coincides with an output target temperature corresponding to a set heating capacity.

On the other hand, also in the dedicated water heater for heating 100b even in the operation ON state, when the heating operation signal Sst is set to "0," the circulation pump 170 and the combustion burner 102 are maintained in a stopped state. Also, in the operation OFF state, even when the heating operation signal Sst is set to "1," the circulation pump 170 and the combustion burner 102 are maintained in a stopped state. That is, since the heating medium is not heated, the heating operation is not started.

A heating capacity demand in the heating operation is also input to the dedicated water heater for heating 100b by connection of a predetermined wiring 250 that transmits a heat demand signal to input terminals 211 and 212. Further, the voltage conversion circuit 200 described in the first embodiment converts the input voltage Vin between the input terminals 211 and 212 into the control voltage Vmc input to the controller 130, and the controller 130 detects, as described in the first embodiment, the heating demand from the heating device 180 on the basis of the control voltage Vmc and sets the output target temperature θset of the heating medium. Instead of the voltage conversion circuit 200, it is also possible to use the voltage conversion circuits 201 to 203 described in the modified example of the first embodiment, the second embodiment, and the modified example of the second embodiment.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heat source device for heating comprising:
a heating structure which heats a heating medium supplied to a heating device;
a control circuit which sets a target output of the heating medium after being heated by the heating structure;
an input terminal to which a voltage signal having single polarity is input by an electrical connection with the outside of the heat source device for heating; and
a voltage conversion circuit which converts an input voltage generated at the input terminal into a control voltage input to the control circuit, wherein the control circuit sets the target output according to the control voltage from the voltage conversion circuit, and voltage conversion circuit converts the input voltage into the control voltage such that the control voltage is set to be a voltage within a first voltage range when polarity of the input voltage is a first polarity which is the same as polarity of the control voltage and opposite to a second polarity, wherein the first voltage range does not include the second polarity, and the control voltage is set to be a voltage within a second voltage range when polarity of the input voltage is the second polarity, wherein the second voltage range does not include the second polarity and is not overlapping the first voltage range, the second voltage range does not include zero voltage;

wherein the heat source device further comprising a display or a speaker which notifies that polarity of the electrical connection to the input terminal is wrong when the control voltage is within the second voltage range.

2. The heat source device for heating according to claim 1, wherein the first polarity is a positive voltage, the control circuit stops the heating structure when the control voltage is lower than a predetermined threshold voltage which is a positive voltage, and the control circuit sets the target output higher as the control voltage becomes higher when the control voltage is higher than the predetermined threshold voltage, and the voltage conversion circuit converts the input voltage to the control voltage so that the second voltage range is lower than the predetermined threshold voltage.

3. The heat source device for heating according to claim 1, wherein the voltage conversion circuit converts the input voltage to the control voltage so that the control voltage becomes a reference voltage which is a boundary value of the first and second voltage ranges when the input voltage is a ground voltage, and the control circuit sets the target output higher as an absolute value of a difference between the control voltage and the reference voltage becomes larger.

* * * * *